(12) United States Patent
Tkachuk et al.

(10) Patent No.: US 11,128,653 B1
(45) Date of Patent: Sep. 21, 2021

(54) AUTOMATICALLY GENERATING A MACHINE-READABLE THREAT MODEL USING A TEMPLATE ASSOCIATED WITH AN APPLICATION OR SERVICE

(71) Applicant: Amazon Technologies, Inc., Seattle, WA (US)

(72) Inventors: Oksana Tkachuk, Palo Alto, CA (US); Claudia Cauli, Leicester (GB); Neha Rungta, San Jose, CA (US); Pauline Virginie Bolignano, London (GB); Juan Rodriguez Hortala, Seattle, WA (US); Sean Maher, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 301 days.

(21) Appl. No.: 16/219,622

(22) Filed: Dec. 13, 2018

(51) Int. Cl.
| | |
|---|---|
| H04L 29/06 | (2006.01) |
| H04L 12/26 | (2006.01) |
| H04L 12/24 | (2006.01) |
| G06F 16/901 | (2019.01) |
| G06F 9/50 | (2006.01) |
| G06F 16/36 | (2019.01) |
| G06F 16/335 | (2019.01) |

(52) U.S. Cl.
CPC ........ *H04L 63/1433* (2013.01); *G06F 9/5061* (2013.01); *G06F 16/335* (2019.01); *G06F 16/367* (2019.01); *G06F 16/9024* (2019.01); *H04L 41/12* (2013.01); *H04L 41/145* (2013.01); *H04L 41/5054* (2013.01); *H04L 43/045* (2013.01); *H04L 63/1425* (2013.01)

(58) Field of Classification Search
CPC . H04L 63/1433; H04L 43/045; H04L 41/145; H04L 41/5054; H04L 63/1425; H04L 41/12; G06F 9/5061; G06F 16/367; G06F 16/335; G06F 16/9024
See application file for complete search history.

(56) References Cited

U.S. PATENT DOCUMENTS

| | | | | |
|---|---|---|---|---|
| 9,210,185 | B1* | 12/2015 | Pinney Wood | ....... G06F 21/577 |
| 2007/0067845 | A1* | 3/2007 | Wiemer | .............. H04L 63/1433 |
| | | | | 726/25 |

(Continued)

*Primary Examiner* — J. Brant Murphy
(74) *Attorney, Agent, or Firm* — Nicholson De Vos Webster & Elliott LLP

(57) ABSTRACT

In some embodiments, a system is provided, and computer-executable instructions cause the system to: obtain a file with instructions for provisioning resources of a service by referencing types of compute resources and including instructions for generating a customized resource of a first type; determine that the file references a first type of compute resources; retrieve threat modeling information associated with the first type of resource, including information identifying a first potential threat; generate a graph with nodes representing the first type of resource, the customized resource, and the first potential threat, and an edge connecting the first node and the second node with a predicate indicative of the relationship them; generate an ontology statement that relate the customized resource and first type of resource; and provide a plurality of ontology statements representing the graph to a reasoner to perform at least a portion of a security review without user intervention.

20 Claims, 6 Drawing Sheets

(56) References Cited

U.S. PATENT DOCUMENTS

| | | | |
|---|---|---|---|
| 2007/0136788 A1* | 6/2007 | Monahan | H04L 63/20 |
| | | | 726/3 |
| 2007/0226796 A1* | 9/2007 | Gilbert | H04L 63/1425 |
| | | | 726/22 |
| 2009/0157446 A1* | 6/2009 | McCreary | G06Q 10/10 |
| | | | 705/7.28 |
| 2010/0110933 A1* | 5/2010 | Wilcock | G06Q 10/10 |
| | | | 370/255 |
| 2010/0114618 A1* | 5/2010 | Wilcock | G06Q 10/06375 |
| | | | 705/7.37 |
| 2010/0205167 A1* | 8/2010 | Tunstall-Pedoe | G06F 16/24 |
| | | | 707/706 |
| 2016/0164906 A1* | 6/2016 | Pinney Wood | G06F 21/577 |
| | | | 726/25 |
| 2017/0180407 A1* | 6/2017 | Zage | H04L 63/1433 |
| 2017/0286690 A1* | 10/2017 | Chari | G06F 21/577 |
| 2018/0027006 A1* | 1/2018 | Zimmermann | G06F 9/46 |
| | | | 726/11 |
| 2018/0159876 A1* | 6/2018 | Park | G06F 16/9024 |
| 2019/0182273 A1* | 6/2019 | Walsh | H04L 63/1416 |
| 2019/0259033 A1 | 8/2019 | Reddy | G06N 3/08 |
| 2019/0311367 A1 | 10/2019 | Reddy | G06N 20/00 |
| 2019/0311810 A1* | 10/2019 | Sevenster | G06Q 50/22 |

* cited by examiner

AUTOMATICALLY GENERATING A MACHINE-READABLE THREAT MODEL USING A TEMPLATE ASSOCIATED WITH AN APPLICATION OR SERVICE

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

To facilitate increased utilization of data center resources, virtualization technologies can allow a single physical computing device to host one or more instances of virtual computing resources, such as virtual machines that appear and operate as independent computing devices to users of a data center. The single physical computing device can create, maintain, delete, or otherwise manage virtual resources in a dynamic manner. In some scenarios, various virtual machines may be associated with different combinations of operating systems or operating system configurations, virtualized hardware and networking resources, and software applications, to enable a physical computing device to provide different desired functionalities, or to provide similar functionalities more efficiently.

In turn, users can request computer resources from a data center, including single computing devices or a configuration of networked computing devices, and be provided with varying numbers of virtual machine resources. Virtualization also scales upward from virtual machines; entire data centers and even multiple data centers may implement computing environments with varying capacities, such as a virtual private network and a virtual private "cloud" computing environment. A network of hardware computing devices can cooperatively use virtualization technologies to provide virtual computing resources and computing services to users of a computing resource service provider. Access to resources and data can be tightly controlled by a user account owner, an administrator, a group, a service, or the computing resource service provider itself; access can be based on many different parameters, such as user credentials, resource attributes, network configurations, and the like.

The provision of virtual computing resources as discrete instances configured for use as if they were typical data center hardware components, such as servers, disk storage, and network adapter cards, which is sometimes referred to as infrastructure as a service (IaaS). An IaaS provider can also provide backend computing architecture implementing computing resources and services for, among other things, billing and account management, networking support such as monitoring and load balancing, security, backup and redundancy, and resource configurations and interoperability frameworks. A user can invoke these resources and services to create workflows, automate tasks, monitor and update deployed infrastructure, and otherwise manage its computing resources. An IaaS framework can enable a user to manage its infrastructure programmatically, a concept which is sometimes referred to as infrastructure as code (IaC). The "code" in IaC is machine-readable instructions organized as discrete definitions for each infrastructure component; the provider's virtual resource management service executes the instructions to rapidly provision, configure, and deploy instances of a virtual computing resource. IaC automates infrastructure deployment and combats configuration drift by conforming virtual resource instances to the corresponding definition. The service provider can make available tools that allow a user to manage the deployment of such infrastructure.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
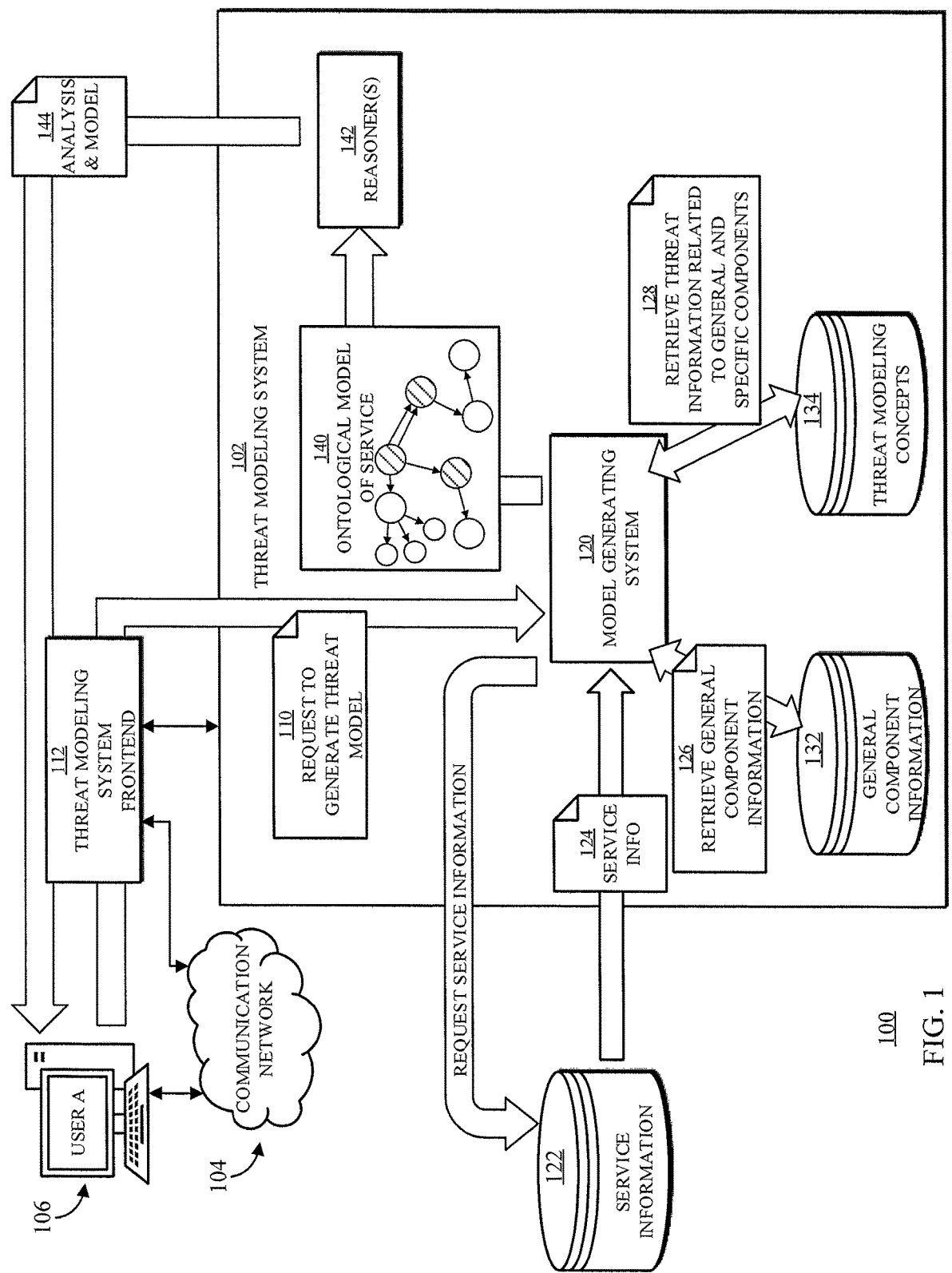
FIG. 1 depicts an example of a system for automatically generating a machine-readable threat model using a template associated with an application or service in accordance with some embodiments of the disclosed subject matter.

In the following description, various embodiments will be described. For purposes of explanation, specific configurations and details are set forth in order to provide a thorough understanding of the embodiments. However, it will also be apparent to one skilled in the art that the embodiments can be practiced without the specific details. Furthermore, well-known features may be omitted or simplified in order not to obscure the embodiments being described.

Mechanisms described herein relate to generating a machine-readable threat model of a software application and/or service (note that hereafter the term service is generally used for simplicity). Such a threat model can be used to facilitate a security review of the service in order to identify potential security threats associated with the modeled configuration of the service. The threat model can also be used to identify potential strategies for mitigating threats that are associated with the modeled configuration of the service. A computing resource service provider, such as a company or other organization, can operate computing resources to provide network and/or computing infrastructure that can be used to provide a service. For example, such resources can be used to provide access to a web page, access to a database, access to streaming content, access to productivity software, access to an online marketplace, etc. Such services can generally be accessed from any location with a network connection and valid credentials (e.g., username, password, domain, etc.). However, providing access to any computing service exposes that service to potential security threats. Such security threats can take many forms, which can be categorized in various ways.

One relatively common scheme used when evaluating security threats is to evaluate whether various components of a service are vulnerable to different types of threats, such as spoofing, tampering, repudiation, information disclosure, denial of service, and elevation of privilege. As a group, these threats are sometimes referred to using the acronym STRIDE. For example, spoofing attacks can involve an unauthorized party (e.g., a person or automated system) attempting to gain access to an asset using falsified identifying information. As another example, tampering can involve attempting to modify authentic data to gain unauthorized access to an asset, such as through cross site scripting, SQL injection, etc. As yet another example, repudiation can involve attempting to modify logged activity to add or remove information to avoid detection of unauthorized activities. Examples of activities related to repudiation can include removing logged actions to attempt to avoid detection of malicious activity, alteration of logs to give the appearance that a system was accessed by a different user, etc. Note that repudiation can occur any time a system is unable to correctly associate an action with a particular individual. Accordingly, tampering with logs can lead to a malicious user being able to successfully repudiate that they took a particular action. As still another example, information disclosure can involve unauthorized access to confidential information. In a more particular example, an unauthorized user may be able to gain access to confidential information through a spoofing attack, but if the information is encrypted the attacker may not be able to extract meaningful data from the underlying confidential information. As a further example, denial of service can involve preventing authorized access to an asset or service. In a more particular example, a denial of service attack can involve attempting to prevent access by authorized users to a database (e.g., as a means of extorting money from the owner or users of the database). As an additional example, escalation of privilege can involve a user that is authorized to perform certain actions (e.g., access a non-password protected portion of a web page) acquiring additional privileges that would allow the attacker to perform unauthorized actions (e.g., accessing the password protected portion of the web page, exfiltrating confidential information, changing settings, etc.). Note that threats may fall into multiple STRIDE categories, such as a threat that allows a malicious user to obfuscate their actions through tampering with logs, which can fall into the repudiation category and the tampering category.

In general, security reviews are intended to identify potential vulnerabilities in a service, and determine whether adequate measures are in place to mitigate such vulnerabilities. This can also involve determining whether the service being evaluated follows various security best practices. A large number of factors can influence the security of an application and/or service. For example, the way that data flows from one node (e.g., hardware and/or software component) to another can be a factor that influences security. As another example, the assets that an unauthorized user may wish to access (e.g., whether the asset is the application itself, data accessed through the service, etc.) can be a factor that influences security. As yet another example, entry points into the application and/or service can be a factor that influences security. As still another example, the internal and/or external dependencies (e.g., other applications, services, libraries, etc., that the application and/or service is reliant on) of the application and/or service can be a factor that influences security. Other examples of factors that can influence security can include network configurations, trust boundaries, underlying logic of the application and/or service, and human interactions with the application and/or service.

For many applications, security reviews are a largely manual process that can include a questionnaire that is used to collect information about the service, such as the deployment network(s), operations that the service will perform, resources that the developer anticipates being used by the service, frameworks, intended users, among other information. The questionnaire can be used to compile an initial list of potential threats, by for example, querying a database of threat information for various properties associated with the service. For example, the database can have information about potential threats associated with various networks, operations, resources, frameworks, users, etc. The developer(s) can provide input related to mitigations that the developer believes are in place for various potential threats, and a security engineer can manually analyze the threats and mitigations. The developer(s) and security engineer can communicate to resolve any discrepancies and/or to develop strategies for mitigating threats appropriately. This process can be labor and/or time intensive, and also relies on the developer to provide a relatively complete and accurate description of the service that is being implemented. It can also require the security engineer(s) to properly identify appropriate mitigation strategies for the various threats.

In accordance with some embodiments of the disclosed subject matter, mechanisms (which can include systems, methods, and/or computer-readable media) for automatically generating a machine-readable threat model using a template associated with an application or service can be provided. In some embodiments, the mechanisms described herein can receive a machine-readable description of the service to be modeled that is used to deploy resources to implement the service. For example, such a machine-readable description of the service can be a template that is developed to manage the deployment of resources in order to provide access to the service being implemented. In some embodiments, the template can be a text document that describes the configuration of resources that are to be deployed, and a service can automatically provision and deploy the resources based on the template. For example, a user can create such a template to automatically provision virtual computing resources to provide access to a particular application, and can update the template to facilitate changing and/or updating the configuration of resources that are deployed. In some embodiments, information included in the template can be used to identify types of resources that are to be deployed, relationships between resources that are to be deployed, information about how the resources are accessed, etc. In a more particular example, the template can be used to instruct an IaC provider to provision, configure, and/or deploy instances of virtual computing resources. In some embodiments, the template can be any suitable type of file, such as a JavaScript Object Notation (JSON) file, a YAML file, an XML file, etc. Additionally, in some embodiments, information included in the template can be used to identify types of resources that have been and/or are currently deployed, relationships between resources that have been and/or are deployed, etc. For example, the template may represent a service that is currently being provided via the compute service.

FIG. 1 depicts an example of a system 100 for automatically generating a machine-readable threat model using a template associated with an application or service in accordance with some embodiments of the disclosed subject matter. As shown in FIG. 1, in some embodiments, system 100 can include a threat modeling system 102 that can automatically generate a machine-readable threat model.

In some embodiments, system 100 can include compute resources 106 associated with a particular user (e.g., "user A") of a service provider that provides access to deployable virtual computing resources (e.g., a service provider that provides IaC functionality). In some such embodiments, the user can be a person (e.g., a developer, a website administrator, an application administrator, etc.) and/or an entity (e.g., a corporation, a non-profit organization, etc.). Additionally, in some embodiments, compute resources 106 can act programmatically to perform one or more actions. Although shown and described as resources provided through a compute service, compute resources 106 can be any suitable computing device or combination of computing devices. For example, compute resources 106 can include physical computing devices associated with a user that are not provided through a compute service (e.g., a personal computer, a laptop computer, a server, a smartphone, a tablet computer, a wearable computer, etc.), virtual computing devices provided through a compute service associated with the same service provider that is associated with threat modeling system 102, and/or through a different platform (e.g., a different compute service). Additionally, in some embodiments, actions described herein as being performed by compute resources 106 can be performed by one or more virtual machines that are provided within compute resources 106 by a compute service in connection with compute resources 106, one or more physical computing devices associated with the compute service (e.g., infrastructure for providing the compute service), one or more other computing devices authorized to act on behalf of the user associated with compute resources 106 (e.g., based on credentials, a certificate, etc.).

In some embodiments, compute resources 106 can be part of a network which can include one or more physical networks (e.g., which can be owned and/or operated by the user associated with compute resources 106) and/or one or more virtual networks (e.g., which can be provided by physical computing devices made available by a service provider and/or by virtual computing devices made available by the service provider) including compute resources made available to the user through a compute service. For example, the network can include any suitable number of virtual machines that can be arranged in a network for performing one or more actions (e.g., providing access to web pages, media content, applications, services, a database, etc.). As another example, the network can include compute resources that are available to the user as a service, such as an electronic data storage service, a network-accessible services system that can perform one or more on-demand functions, load balancing services, database management services, etc. In some embodiments, the network can include compute resources provided by a single physical computing device, by a single data center, by a group of interconnected data centers (e.g., connected by low latency communication links), by groups of interconnected data centers that are not directly connected to other groups of data centers (but that may be connected via a wide area network, such as the Internet). Additionally, in some embodiments, the network can be organized into different subnets, some of which may be physically and/or logically isolated from one another.

In some embodiments, user A can be associated with one or more accounts that can be used to manage virtual resources provided through a compute service. For example, user A can interact with such a compute service to provision, configure, and/or deploy virtual compute resources to provide access to an application and/or service. Such resources can include one or more virtual machines, one or more electronic data storage locations, one or more tables of a database, one or more origin servers for serving streaming content, etc.

In some embodiments, frontend 112 can serve as an access point (e.g., akin to a "front door") to one or more subsystems of a threat modeling system (e.g., threat modeling system 102). For example, frontend 112 can process messages including requests to generate a threat model, information identifying one or more templates to be used to generate the threat model, information identifying a repository of information about the service, information identifying one or more architecture models or diagrams representing the service, information identifying one or more resources used to implement a service that are to be scanned to identify resources used by the service and relationships between the resources, etc., and can determine whether the information is properly authorized (e.g., whether user A of compute resources 106 is authorized to access the identified information (e.g., template(s), information repository, architecture model, etc.), whether user A is authorized to access threat modeling system 102, whether user A is an authenticated user, etc.). In some embodiments, frontend 112 can include one or more web servers configured to expose one or more application program interfaces (APIs) that can receive messages from one or more computing devices (e.g., compute resources 106) as API calls. In some embodiments, frontend 112 can extract requests from the API call and write them to a data store associated with the threat modeling system. For example, compute resources 106 can call the API to request 110 a new or updated threat model for a particular service (e.g., that is associated with one or more templates, architecture models, etc.), to provide supplemental information (e.g., when some piece of information cannot be automatically extracted from the template architecture models, etc.), etc. Note that although request 110 is shown as being sent by compute resources 106 associated with user A, this is merely an example, and such a request can also be provided by other compute resources utilized by user A. For example, a service provider to which a template is submitted can be configured to request that a threat model be generated for a particular template programmatically (e.g., by including language in the template that causes the service provider to request such a model). Note that a template that can be used to instruct a compute service to automatically deploy resources is generally used as an example of information that can be used to identify general and specific components of a service associated with the user. There are various other techniques that can be used to identify general and specific components of a service associated with the user. For example, a model of the service architecture can be used to identify general and specific components of a service associated with the user. As another example, the service can be scanned to identify general and specific components of a service associated with the user. In the examples described below, service information is generally described as a template, but any suitable description of the service can be provided to the system, which can then use the service information to generate a threat model of the service.

In some embodiments, client devices can send requests to model generating system 102 using a communication network 104. In some embodiments, communication network 104 can be any suitable wired network, wireless network, any other suitable network, or any suitable combination thereof. Additionally, communication network 1004 can be any suitable personal area network, local area network, wide area network, over-the-air broadcast network (e.g., for radio or television), cable network, satellite network, cellular telephone network, any other suitable type of network, or any suitable combination thereof. For example, communication network 104 can include a publicly accessible network of linked networks, in some cases operated by various distinct parties, such as the Internet. In some embodiments, communication network 104 can include a private or semi-private network, such as a corporate or university intranet. Additionally, in some embodiments, communication network 104 can include one or more wireless networks, such as a Global System for Mobile Communications (GSM) network, a Code Division Multiple Access (CDMA) network, a Long Term Evolution (LTE) network, any other suitable wireless network, or any suitable combination of wireless networks. Communication network 104 can use any suitable protocols and/or components for communicating via the Internet and/or any of the other aforementioned types of networks. For example, communication network 1004 can use one or more protocols or combinations or protocols, such as Hypertext Transfer Protocol (HTTP), HTTPS, Advanced Message Queing Protocol (AMPQ), Named-Data Networking (NDN), etc.

In the example show in FIG. 1, request 110 to generate a threat model can be received by a model generating system 120 of threat modeling system 102 (E.g., via frontend 112). In some embodiments, request 110 can include identifying information of one or more templates that are to be used to generate a threat model. In such embodiments, model generating system 120 can request one or more templates based on the identifying information from any suitable location. For example, in some embodiments, user A can store a copy of the template in an electronic data store, and request 110 can include information identifying the electronic data store 122, and identifying information of the template to be used. Additionally or alternatively, in some embodiments, request 110 can include one or more template files in the body of the request, as an attachment to the request, etc. In some embodiments, request 110 can itself be a document that serves as the template to be analyzed. In such an example, request 110 can be a text file (e.g., a JSON file, a YAML file, etc.), and model generating system 120 can interpret such a document as a request to generate a threat model based on the document.

In some embodiments, model generating system 120 can request the template identified in the request (e.g., if the request is not included in the request), and can receive service information 124, which can be, for example, one or more template documents. Model generating system 120 can analyze service information 124 to identify components of the service (e.g., components that are referenced in the template), and to determine relationships between the components. For example, model generating system 120 can identify general and/or specific components that are referenced in service information 124. Such components can be services, compute resources, electronic data stores, a database service, etc., that are referenced in service information 124. For example, service information 124 can reference a database table that is to be provisioned via a database service. In such an example, the database service can be a general component that is utilized to generate a specific component (e.g., a particular database table with specific properties). As another example, service information 124 can reference an API that is to be provisioned via an API service. In such an example, the API service can be a general component, and the API that is to be implemented in connection with a service associated with service information 124 can be a specific component. In some embodiments, a general component can be utilized by multiple users and/or services, while a specific component can be a component that is associated with a single user and/or service. For example, an operating system can be a general component, and an instantiation of the operating system with particular settings that is to be launched from a machine image can be a specific component. As another example, authenticated user and unauthenticated user (e.g., representing a user without valid credentials) can be general components that represent concepts related to how other components of a service can be accessed, and a particular type of user, such as a developer or a user that can access the service through a particular entry point can be specific components.

In some embodiments, model generating system 120 can submit a request 126 to retrieve information about general components of the service represented in service information 124 from a repository 132 of concepts related to the general components. For example, general component information repository 132 can include various types of information associated with each of the general components. For example, general component information repository 132 can include ontological information about each of the general components, such as a "type" of the component, a "property" associated with the component. In a more particular example, each general component can be associated with one or more ontological statements, as described below.

In some embodiments, general component information repository 132 can be organized using various techniques. For example, each component can be associated with one or more statements relating the component to one or more other components, one or more actions that the component is configured to execute, etc. In some embodiments, each component represented in general component information repository 132 can be associated with one or more Resource Description Framework (RDF) statements, which can be formatted as 'Subject-Predicate-Object' triples, in which the component can be the subject or object. Such statements can be organized using an RDF vocabulary (e.g., RDF Schema (sometimes referred to as RDFS), Web Ontology Language (OWL), Software Package Data Exchange (SPDX), or Simple Knowledge Organization System (SKOS)) which can be used to provide mechanisms to structure relationships among resources. For example, an RDF Schema can be implemented to allow resources to be related to one another, such as by using statements such as "RestApi is a subclass of ApiService," "invokeFunction ranges over FunctionService objects," or "the domain of invokeFunction must be a Class," etc. In some embodiments, collections of RDF statements can be reasoned about using SPARQL queries, and other query similar languages.

A further layer of semantics can be added by implementing the RDF vocabulary with ontological statements, which can provide mechanisms to convey relationships between resources such as equivalence between predicates or subjects, compatibility, complements, cardinality, intersection, union, inverse of a predicate, etc. For example, ontologies can facilitate compound statements which can convey relatively complex relationships which can be used to make inferences about relationships. In a more particular example, ontologies can be used to represent transitive properties, such as represented in the statement "User receives data from ApiService and ApiService receives from MainFunction object imply that User receives data from MainFunction object." In another more particular example, ontologies can be used to represent symmetry, such as represented in the statement "Entity A is the same as Entity B implies Entity B is the same as Entity A." In yet another more particular example, ontologies can be used to represent an inverse relationship, such as represented in the statement "Threat A is mitigated by setting B implies that setting B mitigates Threat A" or In some embodiments, knowledge modeling techniques using OWL can be used to provide additional semantic meaning to certain statements, with Description Logic providing a formalism that can be used to reason about ontologies. In general, OWL can be used to define an ontology using formal semantics using any of a family of OWL languages, such as OWL Lite, OWL DL, and OWL Full. Such languages can be used to organize data into classes and instances, which can be associated with properties. An OWL ontology can be based on various different syntaxes (e.g., OWL abstract syntax, OWL2 functional syntax, RDF syntaxes such as RDF/XML syntax, OWL2 XML syntax, RDF Turtle, etc.). In general, OWL languages include support for various RDF and RDFS statements, such as rdf:Property, rdf:type, rdfs:domain, rdfs:range, Class, rdfs:subClassOf, and others. OWL Full can be used to express additional relationships that are not permitted in OWL Lite and OWL DL, such as defining a class as both a collection of individuals and as an individual itself. While OWL Full can facilitate more expressive descriptions of data, it also allows for undecidable ontologies. For example, based on the relationship between OWL and RDF, any RDF graph can be analyzed as an OWL Full ontology, but such an RDF graph may include relationships that cause the ontology to be undecidable. OWL ontologies can be reasoned about by semantic reasoners, and OWL DL and OWL Lite ontologies can be reasoned about using complete semantic reasoners.

In some embodiments, ontological statements can be structured in accordance with any suitable technique or combination of techniques. For example, ontological statements can be structured as RDF statements with a particular (e.g., custom) vocabulary and/or language. In a more particular example, ontological statements can be structured as RDFS statements. In another more particular example, ontological statements can be structured as OWL statements. Note that an ontology can include a combination of RDF, RDFS, and OWL statements. In some embodiments, ontologies can be stored in any suitable format. For example, an OWL ontology can be stored as an XML file based on RDF/XML syntax.

In some embodiments, such Description Logic can be built from concepts/properties connected by conjunctions, disjunctions, negation, universal and existential quantification, inclusion, equivalence, etc. Using Description Logic can facilitate querying a model represented using ontologies. For example, if a security engineer were generating a threat model manually, the engineer may ask questions such as:
1) What are the assets?
2) Which threats are the assets immediately exposed to?
3) Which resources can write to the assets?
4) What are the potential mitigations of a threat T?
5) Are the security settings of a given resource R in the set of potential mitigations of threats associated with resource R?

In order to automate such questions, Description Logic statements can be constructed to query a machine-readable threat model generated using the mechanisms described herein for such information. For example, the above questions can be represented in Description Logic using the following representations:
1) isA.asset
2) is A.asset.threat (?)
3) write.(asset)
4) T.canBeMitigatedBy
5) ¬ ((R.SecuritySetting ⊓ R.Threat.canBeMitigatedBy) ≡⊥)

In some embodiments, Description Logic can facilitate the introduction of new concepts using new terminology. For example, a concept of an allowed user can be represented in Description Logic as "AllowedUser≡AuthenticatedUser ⊓ Authorized User." As another example, a concept of only permitting allowed users to make API calls can be represented in Description Logic as "calls.Api ⊑ AllowedUser."

In some embodiments, general component information repository 132 can include ontological statements that describe properties of various resources that users can utilize to build an application and/or service. For example, an OWL-based ontology can include statements such as:
Developers RDF:subClassOf UserWithCredential
UserWithCredential RDF:type TrustLevel & UserWithoutCredential OWL:complementOf UserWithCredential
UserWithCredential OWL:sameAs [rdf:type owl:Class; owl:intersectionOf (AuthenticatedUser AuthorizedUser)]
ApiService RDF:subClassOf EntryPoint
RestApi RDF:subClassOf ApiService
getStream OWL:subPropertyOf reads & getStream RDFS:range DatabaseService
updateTable OWL:subPropertyOf writes & updateTable RDFS:range DatabaseService
calls OWL:sameAs interacts & calls RDFS:range RestApi
cannotInteract OWL:complementOf interacts
Etc.

In some embodiments, model generating system 120 can retrieve relevant information from general component information repository 132 based on the information in service information 124. For example, if service information 124 references an API, model generating system 120 can retrieve statements related to properties of the API that is included in service information 124. As another example, if service information 124 utilizes a database service, model generating system 120 can retrieve statements related to the database service.

In some embodiments, model generating system 120 can submit a request 128 to retrieve threat concept information related to general components represented in service information 124 from a repository 134 of threat modeling concepts that can include information about various threat modeling concepts, such as threats potentially associated with various of the general components, potential mitigations associated with one or more of the threats, etc. 124. For example, threat modeling concept repository 134 can include a list of potential threats associated with at least some of the general components described in statements stored in general component information repository 132, which may or may not be organized as a list (e.g., it may be organized as entries in a relational database, entries in a non-relational database, nodes in a graph, a set of triples, etc.). As another example, each threat can be associated with a list of potential policies that can be implemented to mitigate the threats in threat modeling concept repository 134 (which may or may not be organized as a list). For example, if service information 124 includes a reference to a database named dbTable that is to be implemented using a database service, model generating system 120 can determine that the dbTable is of the type DatabaseService, and can generate a statement relating the table to the service, such as "dbTable RDF:type DatabaseService" (which can be a valid statement in RDF, RDFS, and OWL) based on information from general component information repository 132, and can retrieve threat modeling concepts related to DatabaseService from threat modeling concept repository 134, which can be used to identify potential threats to dbTable. As another example, if service information 124 defines a role (e.g., WhitelistRole) that can be assumed to make changes to the table dbTable to perform a specific action (e.g., to add a user account to a list of accounts that are authorized to submit API requests to the service), model generating system 120 can generate a statement relating the role to the particular table that it is related to, such as "WhitelistRole getStream dbTable" based on information from general component information repository 132, and can retrieve threat modeling concepts related to Roles from threat modeling concept repository 134, which can be use do identify potential threats associated with the WhitelistRole. As yet another example, if service information 124 includes a function that causes the Whitelist role to be invoked to add a new user account to the database dbTable, model generating system 120 can generate a statement relating such a function (e.g., "WhitelistFunction") to the role, and relating the function to a general service, such as by generating the statements "WhitelistFunction assumeRole WhitelistRole & WhitelistFunction RDF:type FunctionService" based on information from general component information repository 132, and can retrieve threat modeling concepts related to FunctionService from threat modeling concept repository 134, which can be used to identify potential threats associated with the FunctionService. Other examples of statements that can be generated can include OWL statements, such as:

WhitelistRole trusts FunctionService;
  AllowedApiUser OWL:sameAs [rdf:type owl:Class; OWL:intersectionOf (AuthenticatedUser AuthorizedUser properRequest)]; and
  calls RDFS:domain AllowedApiUser.

These statements can represent the relationship between the whitelist role and the function service that is invoked to perform the whitelisting operation of adding a user to the database, defines which users are authorized to submit requests based on service information 124, and defines which users are permitted to submit requests to the API. Although threat modeling concept repository 134 is depicted as a component of threat modeling system 102, this is merely an example, and in some embodiments, threat modeling concept repository 134 can be an external component, such as a database that can be queried by other systems and/or users. For example, in some embodiments, threat modeling concept repository 134 can be a commercially or freely accessible resource of threat information (e.g., the Common Attack Pattern Enumeration and Classification list made available by MITRE at https(colon)//capec(dot)mitre (dot)org). As another example, in some embodiments, threat modeling concept repository 134 can be a repository that is accessible internally to other systems and/or users associated a provider of threat modeling system 102, such as for use in manually generating a threat model. In some embodiments, general component repository 132 can include any suitable type of statements. For example, while examples described herein are generally based on OWL, in some embodiments, general components can be described using only RDF statements (e.g., without RDFS or OWL).

In some embodiments, one or more components and/or relationships may not be evident from service information 124, in which case model generating system 120 can prompt a user (e.g., user A) to provide additional information that can be used to generate a more complete model of the service represented in service information 124.

In some embodiments, model generating system 120 can generate a model 140 that can be represented as a graphical representation of the service represented in the template with nodes that represent resources, such as assets, entry points, general services, threats, potential mitigations, etc., and edges that define relationships between the nodes.

In some embodiments, model generating system 120 (and/or one or more other components of threat modeling system 102) can provide model 140 to one or more reasoners 142 (sometimes referred to as semantic reasoners, reasoning engines, and rules engines), which can perform one or more actions to analyze the model. For example, reasoners 142 can answer one or more queries related to the service based on the model, can classify the ontology used to represent the service, and return output providing an automated threat analysis 144, which in some embodiments, can be associated with a graphical model of the service that can be presented to a user. Reasoners can generally perform various decision procedures, such as classification, consistency checking, subsumption, entailment, and query answering, some of which can be helpful in identifying vulnerabilities and/or threats that have been mitigated based on specific configurations of the service under analysis. For example, classification performed by reasoners can involve computing hierarchies of classes and properties, with some reasoners being capable of performing incremental classification in which previous classification information is re-used, and only changes are integrated. An ontology can be classified regularly during development and maintenance to insure that changes made to the service are not causing unanticipated subsumptions. As another example, consistency checking can involve determining whether the ontology contains unsatisfiable terms or assertions, as in general all implications of an ontology should be satisfied. As yet another example, subsumption queries can involve determining whether a concept subsumes another or returns all the concepts that it subsumes or are subsumed by it. As still another example, concept satisfiability checking can involve determining whether an object can have instances or if the object is a subset of the concept OWL:Nothing. Additional features of reasoners can include explanation of inferences, support for rules, and support for SPARQL queries. In some embodiments, a reasoner using one or more unification techniques can be used to establish relationships between components and concepts, which can be used to generate model 140 and/or to answer queries using model 140.

In some embodiments, model generating system 120 can provide a model 140 comprising a set of predefined queries to be answered by reasoner(s) 142, and analysis 144 can provide answers to such queries. For example, such queries can include identifying assets, identifying threats associated with various components of the system, whether there is any potential mitigation for each threat (e.g., based on security policies associated with the component and/or service). In some embodiments, a graphical presentation of model 140 can be presented in connection with the analysis.

In some embodiments, rather than generating a model (e.g., model 140) of the entire service prior to submitting queries to reasoner(s) 142, threat modeling system 102 can query one or more reasoner(s) which are configured to dynamically gather information needed to answer the query from general component information repository 132 and/or threat modeling concept repository 134. In some such embodiments, reasoner(s) 142 can be incorporated into model generating system 120. In some embodiments, service information 124 can be parsed to identify which resources and/or other components are referenced, and the identified information can be used to query reasoner(s) 142.

Figure 2:
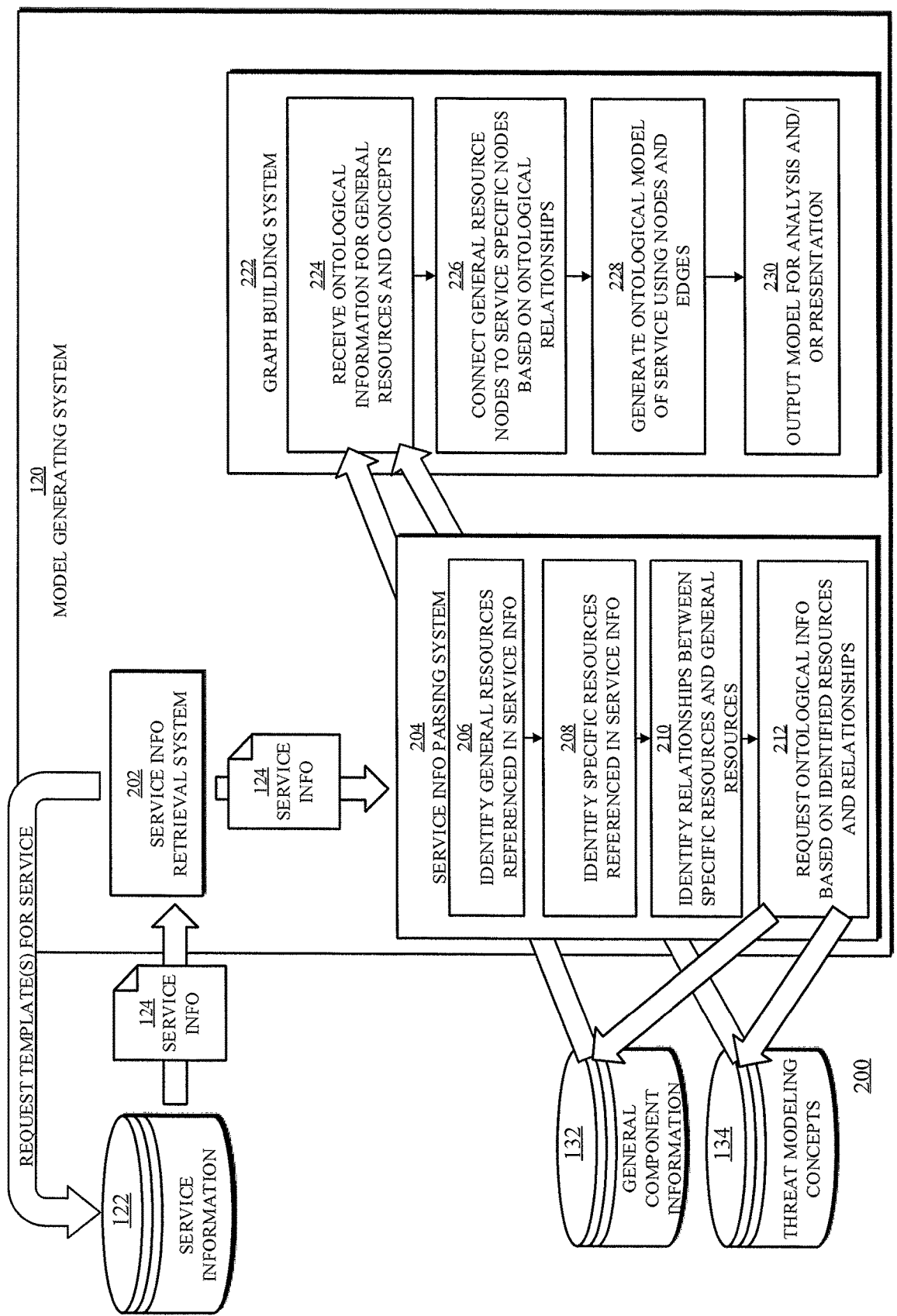
FIG. 2 depicts an example of another system for automatically generating a machine-readable threat model using a template associated with an application or service in accordance with some embodiments of the disclosed subject matter.

FIG. 2 depicts an example of another system 200 for automatically generating a machine-readable threat model using information associated with an application or service in accordance with some embodiments of the disclosed subject matter. As shown in FIG. 2, model generating system 120 can include a service information retrieval system 202 that can request a service information identified in a request to analyze a service. For example, a request can include identifying information of electronic data store 122 and/or permissions that allow service information retrieval system 202 to access electronic data store 122. Additionally or alternatively, as described above, a request can include service information 124 and/or service information 124 can be uploaded to a particular location associated with template retrieval system.

In some embodiments, model generating system 120 can include a service information parsing system 204 that can extract information from service information 124, and retrieve pertinent information from one or more repositories. For example, at 206 service information parsing system 204 can identify general resources that are referenced in service information 124.

At 208, service information parsing system 204 can identify specific resources (e.g., particular instantiations of general resources that are to be deployed) referenced in service information 124.

At 210, service information parsing system 204 can identify relationships between specific resources identified at 208 and general resources identified at 206.

At 212, service information parsing system 204 can request ontological information about general resources and/or threats based on the identified resources and relationships.

In some embodiments, model generating system 120 can include a graph building system 222 that can receive the ontological information requested by service information parsing system 204, and can generate a threat model using the ontologies and service information 124. For example, at 224, graph building system 222 can receive ontological information for the general resources and threat modeling concepts related to the service represented in service information 124.

At 226, graph building system 222 can use ontological concepts to connect nodes representing general services with nodes representing particular implementations that are associated with the service represented in service information 124.

At 228, graph building system 222 can generate an ontological model of the service represented in service information 124 using the nodes and edges generated at 226.

At 230, graph building system 222 can output the model for automated analysis and/or presentation to a user. For example, graph building system 222 can provide the output to one or more reasoners, as described above in connection with FIG. 1.

Figure 3:
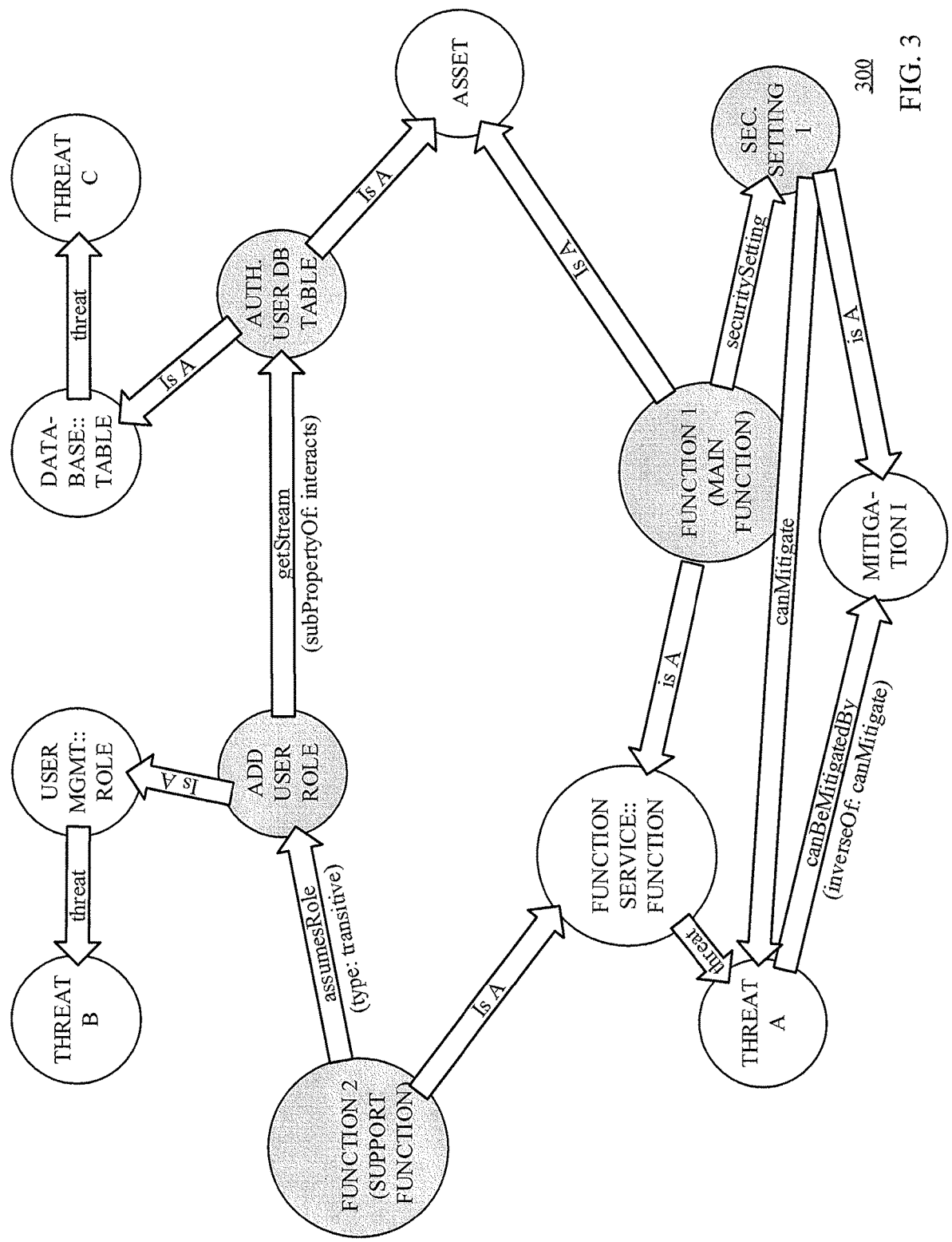
FIG. 3 depicts an example graphical representation of a portion of an ontology-based machine-readable threat model for an application or service in accordance with some embodiments of the disclosed subject matter.

FIG. 3 depicts an example 300 graphical representation of a portion of an ontology-based machine-readable threat model for an application or service in accordance with some embodiments of the disclosed subject matter. In FIG. 3 white circles represent general resources, and grey circles represent specific instantiations used by the service being modeled. Arrows show ontological relationships between the various components. For example, model generating system 120 can identify FunctionService as being referenced in service information 124 and can retrieve information (e.g., from general component information repository 132) related to FunctionService, which can indicate that FunctionService can be vulnerable to threat A, which can potentially be mitigated by mitigation I. Based on service information 124, model generating system 120 can also identify a specific function (e.g., Function I) that utilizes FunctionService, and which is associated with a particular security setting (e.g., security setting I). In some embodiments, model generating system 120 can generate a relationship between Function 1 and FunctionService, as Function I is a particular instantiation that uses FunctionService. During analysis, a reasoner can identify that Function I is an instance of FunctionService::Function, and based on that determine that Function I is potentially vulnerable to threat A. Given this, the reasoner can determine whether security setting I potentially mitigates threat A by comparing security setting I to mitigation I. Note that although FIG. 3 depicts many relationships represented using OWL techniques, this is merely an example, and any suitable technique can be used to generate a graph model of the service. For example, using RDF statements, using RDFS statements, using OWL statements, any other suitable type of statements (e.g., using a customized vocabulary that is linked to and/or based on OWL), or any suitable combination thereof.

Figure 4:
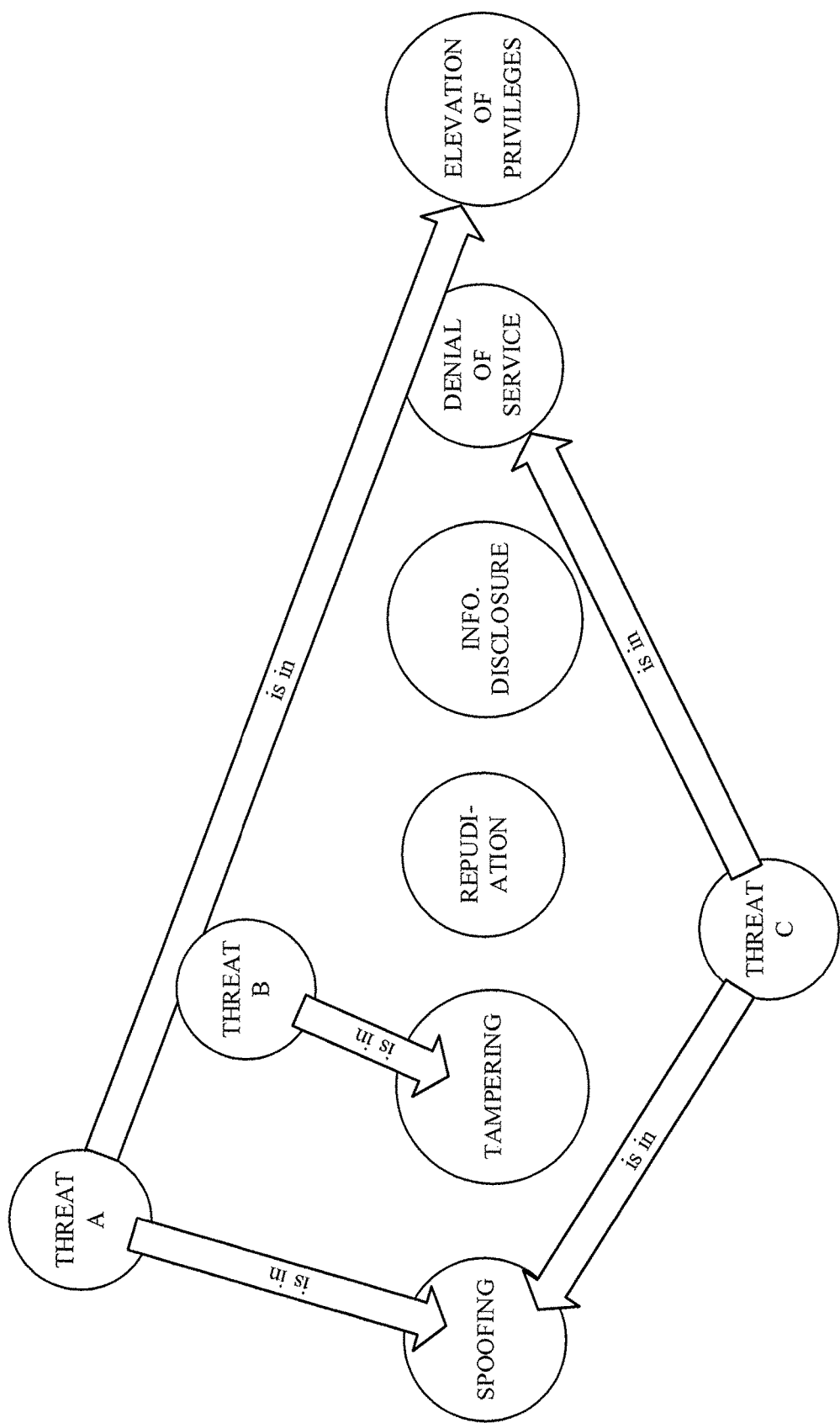
FIG. 4 depicts another example graphical representation of a portion of an ontology-based machine-readable threat model for an application or service in accordance with some embodiments of the disclosed subject matter.

FIG. 4 depicts another example 400 graphical representation of a portion of an ontology-based machine-readable threat model for an application or service in accordance with some embodiments of the disclosed subject matter. As shown in FIG. 4, various threats associated with the model of the service represented in service information 124 can be associated with different types of threat, which can be used, for example, to identify potential mitigations. For example, threat A may be associated with both threat types "spoofing attacks" and "elevation of privileges". Such a graphical representation can assist a user in understanding the potential threats to the service that have been identified. In some embodiments, graph 400 can also include potential mitigations that have been implemented and/or can be implemented to mitigate one or more of the threats. In some embodiments, graphical representation 400 can be used to summarize the types of threats that the service is potentially exposed to. Note that FIG. 4 depicts one example of a graph that represents categorization of threats. However, threats can be categorized using other techniques. For example, threats can be categorized based on risk level, which can be based on the sensitivity of the information that the threat would potentially expose. As another example, threats can be categorized based on a ranking of importance of addressing the threat, which can be based on a combination of the sensitivity of the information, whether any mitigations are already in place, the cost (in time and/or money) of implementing one or more recommended mitigations, etc.

Figure 5:
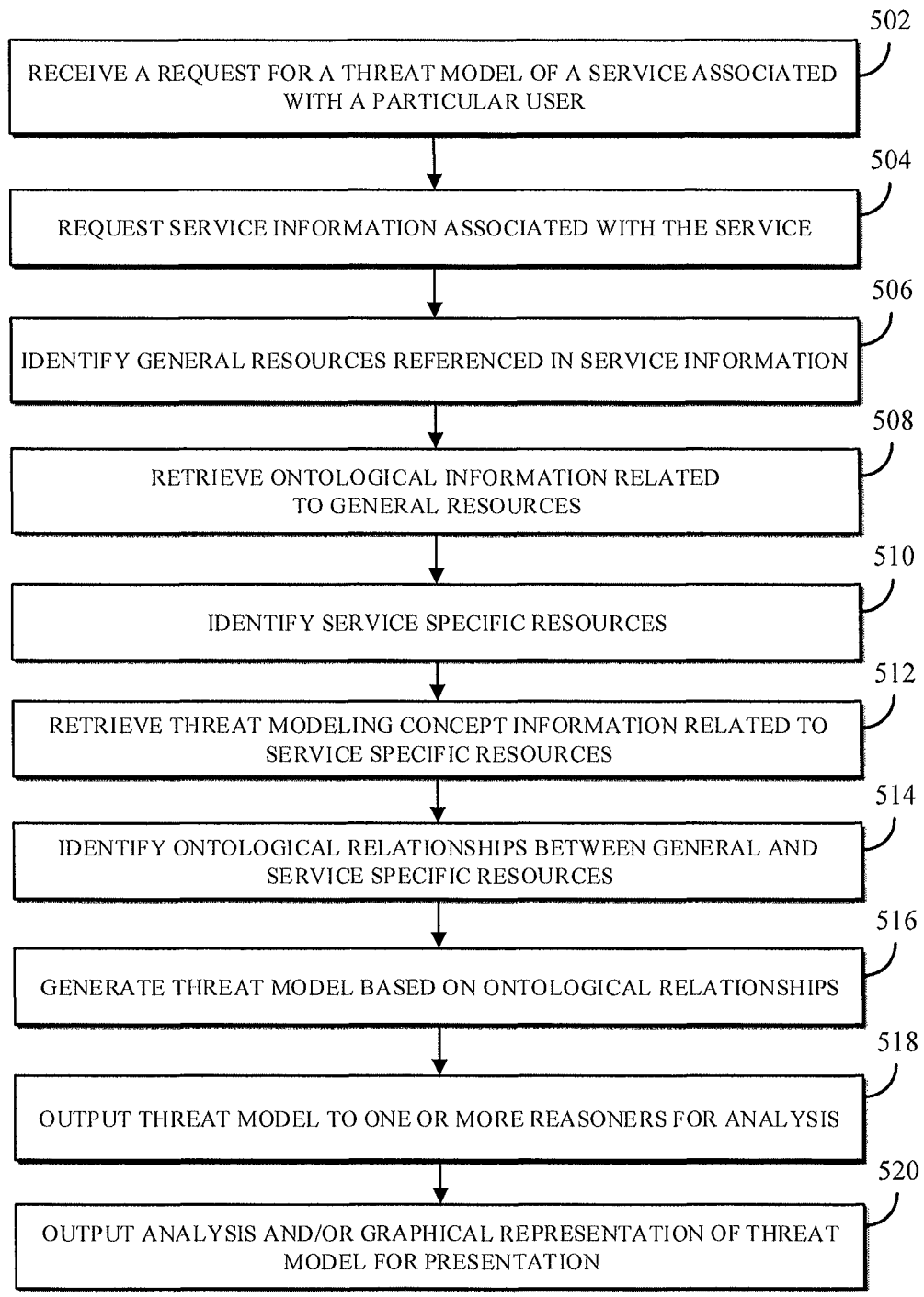
FIG. 5 depicts an example of a process for automatically generating a machine-readable threat model using a template associated with an application or service in accordance with some embodiments of the disclosed subject matter.

FIG. 5 depicts an example 500 of a process for automatically generating a machine-readable threat model using information associated with an application or service in accordance with some embodiments of the disclosed subject matter. At 502, process 500 can receive a request for a threat model of a service associated with a particular user. For example, as described above in connection with FIG. 1, a user can submit such a request via a frontend, which can include an API. In some embodiments, the request can include identifying information that can be used to retrieve service information (e.g., a template of at least a portion of the service to be evaluated). Additionally or alternatively, the request can include service information (e.g., a template of at least a portion of the service to be evaluated).

At 504, process 500 can request service information (e.g., service information 124 such as a resource management template) that is associated with the service. For example, process 500 can request a template from an electronic data store, where the template can be used to cause a compute resource provider to automatically provision compute resources to implement at least a portion of the service. Alternatively, in some embodiments, when service information is submitted with the request 504 can be omitted.

At 506, process 500 can identify general resources referenced in the service information. For example, process 500 can parse the text of a resource management template, and can attempt to identify general resources based on whether a name associated with the resource is listed in the text.

At 508, process 500 can retrieve ontological information related to the general resources identified at 506. For example, process 500 can retrieve the information from a repository of such information that can include various properties of the resource, such as associated threats and mitigations.

At 510, process 500 can identify resources that are specific to the service being implemented, such as a particular function that is to be executed by a particular service, a particular type of table that is to be used to store user information, etc.

At 512, process 500 can retrieve threat modeling concept information related to the specific resources identified at 510. For example, process 500 can retrieve ontologies that can be used to connect the general resources to the specific resources that are instantiations of the general resource.

At 514, process 500 can identify ontological relationships between components of the service, such as between general resources and other general resources, between general resources and specific resources, etc. In some embodiments, some ontological relationships may already exist, such as relationships between general resources and potential threats, between potential threats and potential mitigations for those threats, etc.

At 516, process 500 can generate a threat model based on the ontological relationships by connecting nodes representing resources with edges representing the ontological relationships. For example, process 500 can generate a graph such as the graph depicted in FIG. 3.

At 518, process 500 can output the threat model to one or more reasoners for analysis. For example, in some embodiments, process 500 can submit the model to one or more reasoners with various queries that are to be used to evaluate the service.

At 520, process 500 can output an analysis and/or a graphical representation of the threat model for presentation to a user. For example, process 500 can cause compute resources 106 to present a graphical representation of the threat model in a graphical user interface that can facilitate understanding of the threat model by a user. In some embodiments, the analysis can include one or more threats identified by threat modeling system 102, one or more mitigations that have been implemented to ameliorate at least a portion of the one or more threats, additional mitigations that can be implemented to improve the information security of the service, etc.

Figure 6:
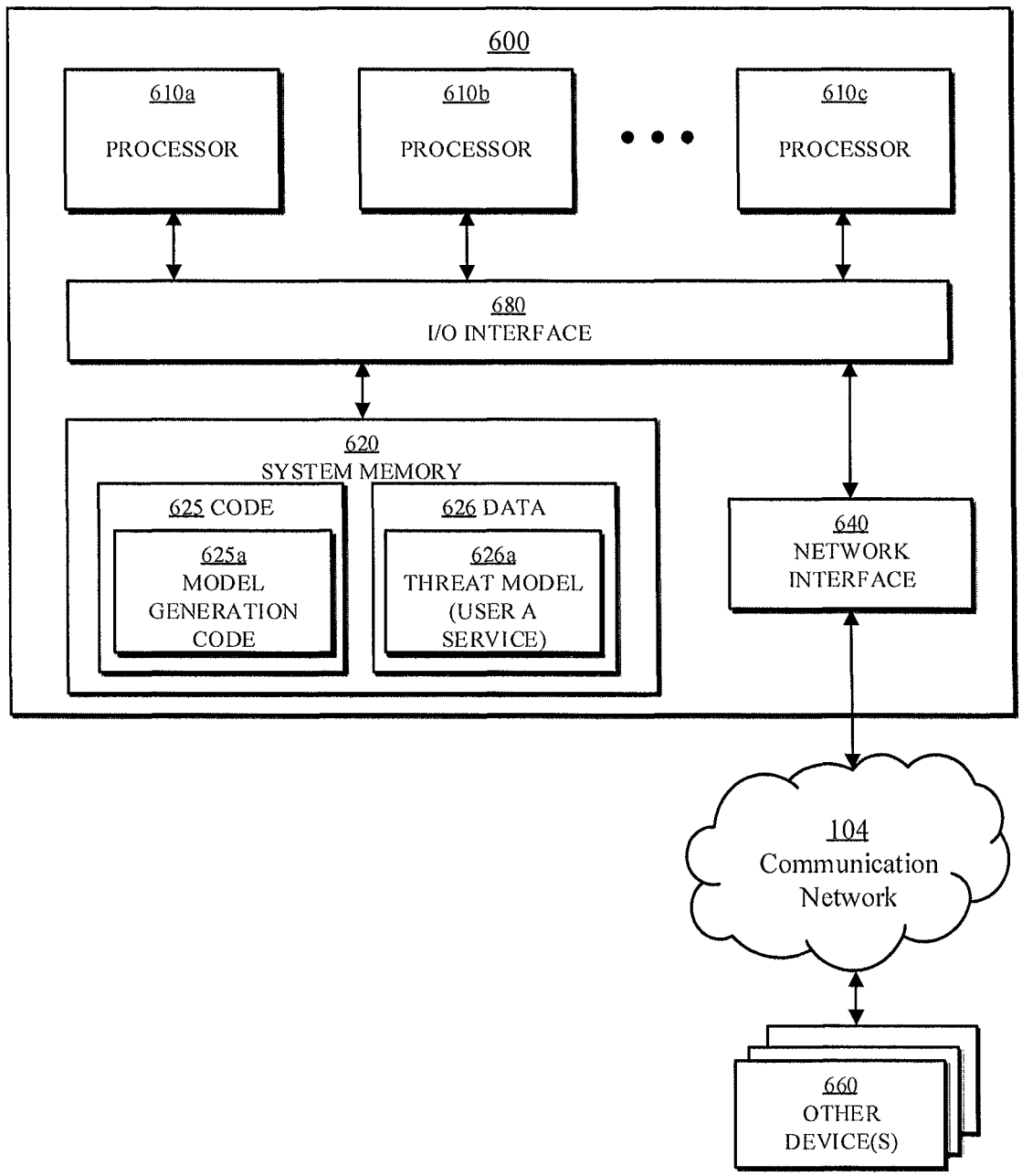
FIG. 6 is a block diagram depicting functional components of a general-purpose computing device that can be used to implement at least a portion of the mechanisms described herein in accordance with some embodiments of the disclosed subject matter.

FIG. 6 is a block diagram depicting functional components of a general-purpose computing device 600 that can be used to implement at least a portion of the mechanisms described herein in accordance with some embodiments of the disclosed subject matter. In at least some embodiments, a computing device that implements a portion or all of one or more of the technologies described herein, including the techniques to implement the functionality of a system for automatically scaling an origin in anticipation of an increase in cache misses can include a general purpose computer system that includes or is configured to access one or more computer-accessible media. For example, compute resources 106, electronic data store 122, general component information repository 132, threat modeling system 102, etc., can be implemented using one or more portions of system 600. As shown in FIG. 6, computing device 600 can include one or more processors 610a, 610b, and/or 6100n (which may be referred herein singularly as "processor 610" or in the plural as "processors 610") coupled to system memory 620 via an input/output (I/O) interface 680. Computing device 600 can further include a network interface 640 coupled to I/O interface 680.

In some embodiments, computing device 600 may be a uniprocessor system including one processor 610 or a multiprocessor system including several processors 610 (e.g., two, four, eight, or another suitable number). Processors 610 can be any suitable processor(s) capable of executing instructions. For example, in various embodiments, processors 610 can be general-purpose or embedded processors implementing any of a variety of instruction set architectures (ISAs), such as the x86, Power PC, SPARC, or MIPS ISAs, or any other suitable ISA. In multiprocessor systems, each of processors 610 can commonly, but not necessarily, implement the same ISA.

System memory 620 can be configured to store instructions and data accessible by processor(s) 610. In some embodiments, system memory 620 can be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and/or data described above, are shown stored within system memory 620 as code 625 and data 626. For example, code 625 can include code for executing process 500 described above in connection with FIG. 5, and/or to implement one or more portions of threat modeling system 120.

In some embodiments, I/O interface 680 can be configured to coordinate I/O traffic between processor(s) 610, system memory 620, and any peripheral devices in computing device 600, including network interface 640 or other peripheral interfaces. In some embodiments, I/O interface 680 can perform any necessary protocol, timing, or other data transformations to convert data signals from one component (e.g., system memory 620) into a format suitable for use by another component (e.g., processor 610). In some embodiments, I/O interface 680 may include support for devices attached through various types of peripheral buses, such as a variant of the Peripheral Component Interconnect (PCI) bus standard or the Universal Serial Bus (USB) standard, for example. In some embodiments, the function of I/O interface 680 can be split into two or more separate components, such as a north bridge and a south bridge, for example. Also, in some embodiments some or all of the functionality of I/O interface 680, such as an interface to system memory 620, can be incorporated directly into processor 610.

Network interface 640 can be configured to allow data to be exchanged between computing device 600 and other device or devices 660 in communication with communication network 104, such as other computer systems or devices as illustrated in FIGS. 1 and 2, for example. In some embodiments, network interface 640 can support communication via any suitable wired or wireless general data networks, such as types of Ethernet networks, for example. Additionally, network interface 640 can support communication via telecommunications/telephony networks, such as analog voice networks or digital fiber communications networks, via storage area networks, such as Fiber Channel SANs, or via any other suitable type of network and/or protocol.

In some embodiments, system memory 620 can be any suitable computer-accessible medium configured to store program instructions and data for implementing embodiments of the present methods and apparatus. Additionally or alternatively, in some embodiments, program instructions and/or data may be received, sent or stored upon different types of computer-accessible media. In general, a computer-accessible medium can any include non-transitory storage media or memory media, such as magnetic or optical media, e.g., disk or DVD/CD coupled to computing device 600 via I/O interface 680. A non-transitory computer-accessible storage medium may also include any volatile or non-volatile media, such as RAM (e.g., SDRAM, DDR SDRAM, RDRAM, SRAM, etc.), ROM, etc., that can be included in some embodiments of computing device 600 as system memory 620, or another type of memory. Further, a computer-accessible medium can include transmission media or signals such as electrical, electromagnetic or digital signals, conveyed via a communication medium such as a network and/or a wireless link, such as can be implemented via network interface 640. In some embodiments, portions or all of multiple computing devices, can be used to implement the mechanisms described herein; for example, software components running on a variety of different devices and servers can collaborate to provide the functionality. In some embodiments, portions of the mechanisms described herein can be implemented using storage devices, network devices, or special purpose computer systems, in addition to, or in lieu of, being implemented using general purpose computer systems (e.g., computing device 600). The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of client devices can be termed a provider network. Such a provider network can include numerous data centers hosting various resource pools, such as collections of physical and/or virtualized computer servers, storage devices, networking equipment, and the like, needed to implement and distribute the infrastructure and services offered by the provider network. The resources can, in some embodiments, be offered to customers in units called instances, such as virtual or physical computing instances or storage instances. A virtual computing instance may, for example, include one or more servers with a specified computational capacity (which can be specified by indicating the type and number of CPUs, the main memory size, etc.) and a specified software stack (e.g., a particular version of an operating system, which can in turn run on top of a hypervisor).

A number of different types of computing devices can be used singly or in combination to implement the resources of the provider network in different embodiments, including general-purpose and/or special-purpose computer servers, storage devices, network devices, and the like. In some embodiments, a customer or user can be provided direct access to a resource instance (e.g., by giving a user an administrator login and password). Additionally or alternatively, in some embodiments, the provider network operator can allow customers to specify execution requirements for specified customer applications and schedule execution of the applications on behalf of the customer on execution platforms (such as application server instances, Java™ virtual machines (JVMs), general purpose or special purpose operating systems, platforms that support various interpreted or compiled programming languages, such as Ruby, Perl, Python, C, C++, and the like, or high performance computing platforms) suitable for the applications, without, for example, requiring the customer to access an instance or an execution platform directly. A given execution platform can utilize one or more resource instances in some implementations; in other implementations multiple execution platforms can be mapped to a single resource instance.

In many environments, operators of provider networks that implement different types of virtualized computing, storage, and/or other network-accessible functionality can allow customers to reserve or purchase access to resources in various resource acquisition modes. The computing resource provider can provide facilities for customers to select and launch the desired computing resources, deploy application components to the computing resources, and maintain an application executing in the environment. In addition, the computing resource provider can provide further facilities for the customer to quickly and easily scale up or scale down the numbers and types of resources allocated to the application, either manually or through automatic scaling, as demand for or capacity requirements of the application change. The computing resources provided by the computing resource provider can be made available in discrete units, which can be referred to as instances. An instance can, for example, represent a physical server hardware platform, a virtual machine instance executing on a server, or some combination of the two. Various types and configurations of instances can be made available, including different sizes of resources executing different operating systems (sometimes referred to as an OS) and/or hypervisors and with various installed software applications, runtimes, and the like. Instances can further be available in specific availability zones, representing a data center or other geographic location of the underlying computing hardware, for example.

In some embodiments the provider network can be organized into a plurality of geographical regions, and each region can include one or more availability zones. An availability zone (which can also be referred to as an availability container) in turn can include one or more distinct locations or data centers, configured in such a way that the resources in a given availability zone can be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Customers can be able to protect their applications from failures at a single location by launching multiple application instances in respective availability zones. At the same time, in some implementations, inexpensive and low latency network connectivity can be provided between resource instances that reside within the same geographical region (and network transmissions between resources of the same availability zone may be even faster).

The provider network can make instances available "on-demand," allowing a customer to select a number of instances of a specific type and configuration (e.g. size, platform, tenancy, availability zone, and the like) and quickly launch the instances for deployment. On-demand instances can further be added or removed as needed, either manually or automatically through auto scaling, as demand for or capacity requirements change over time. The customer can incur ongoing usage costs related to their on-demand instances, based on the number of hours of operation and/or the actual resources utilized, for example.

The computing resource provider can also make reserved instances available to the customer. Reserved instances can provide the customer with the ability to reserve a number of a specific type and configuration of instances for a fixed term, such as one year or three years, for a low, up-front cost in exchange for reduced hourly or other usage costs, for example, if and when the instances are launched. This can allow the customer to defer costs related to scaling up the deployed application in response to increase in demand, while ensuring that the right resources will be available when needed. While reserved instances provide customers with reliable, stand-by capacity for scaling of their application, purchasing reserved instances can also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks can in some cases implement a flexible set of resource reservation, control, and access interfaces for their customers. For example, a resource manager of the provider network can implement a programmatic resource reservation interface (e.g., via a web site or a set of web pages) that allows customers to learn about, select, purchase access to and/or reserve resource instances. In some embodiments described below where an entity, such as a resource manager or a pricing optimizer, is described as implementing one or more programmatic interfaces, such as a web page or an API, an interface manager subcomponent of that entity can be responsible for the interface-related functionality. In some embodiments, equivalent interface-related functionality can be implemented by a separate or standalone interface manager, external to the resource manager. Such an interface can include capabilities to allow browsing of a resource catalog and details and specifications of the different types or sizes of resources supported and the different reservation types or modes supported, pricing models, and so on.

In accordance with some embodiments of the disclosed subject matter, a system is provided, the system comprising one or more processors and memory storing computer-executable instructions that, when executed by the one or more processors, cause the system to: obtain a file that includes instructions for provisioning compute resources to implement a service associated with a user, wherein the file references a plurality of types of compute resources to be provisioned and the file includes instructions for generating a first customized resource of a first type of compute resource of the plurality of types of compute resources referenced by the file; determine that the file references the first type of compute resources; retrieve threat modeling information associated with the first type of compute resources, wherein the threat modeling information includes information identifying a first potential threat associated with the first type of compute resources; generate a graph comprising a plurality of nodes and a plurality of edges, wherein a first node represents the first type of compute resources, a second node represents the first customized resource, and a third node represents the first potential threat, and wherein an edge connecting the first node and the second node is associated with a predicate based on the relationship between the customized resource and the first type of resource; generate at least one ontological statement relating the first customized resource and the first type of compute resource; and provide a plurality of ontological statements, including the at least one ontological statement, representing the graph to a reasoner to perform at least a portion of a security review without user intervention, wherein performing at least a portion of the security review comprises identifying a threat and determining whether the service includes a corresponding mitigation for the threat.

In some embodiments, the at least one ontological statement is a Resource Description Framework (RDF) statement or a Web Ontology Language (OWL) statement.

In some embodiments, the threat modeling information associated with the first type of compute resources is at least a portion of an ontology related to the first type of compute resources.

In some embodiments, the instructions, when executed by the one or more processors, further cause the system to: generate a second edge between the second node and a fourth node representing an asset concept; and create an association between the second edge an RDF statement indicating that the customized resource is an example of an asset.

In accordance with some embodiments, a system is provided, the system comprising one or more processors and memory storing computer-executable instructions that, when executed by the one or more processors, cause the system to: obtain a request associated with a user to generate a machine-readable threat model of a service associated with the user, wherein the service utilizes a plurality of different types of compute resources associated with a compute resource provider to implement components of the service; obtain a data set describing how resources associated with the service are to be provisioned to implement at least a portion of the service, wherein the data set is configured to cause the compute resource provider to automatically provision the components of the service upon submission of the file to a system that can control deployment of the plurality of different types of compute resources; retrieve ontology information associated with a first type of compute resources of the plurality of compute resources, wherein the ontology information includes information about a first potential threat associated with the first type of compute resources, and a statement describing a property of the first type of compute resources; generate a graph comprising a first node associated with the first type of compute resources, a second node associated with the first potential threat, a third node associated with a first component of the service that is provisioned using the first type of compute resources, and a fourth node associated with a security setting of the first component of the service that potentially mitigates the first potential threat, with a first edge between the first node and the second node indicating that the first potential threat is a threat to the first type of compute resources, a second edge between the first node and the third node indicating that the first component is an example of the first type of compute resources; and cause a representation of the graph to be presented, including an indication that the first potential threat is potentially mitigated by the security setting.

In some embodiments, the ontology comprises a plurality of ontological statements, each of the plurality of ontological statements being a Resource Description Framework (RDF) statement or a Web Ontology Language (OWL) statement.

In some embodiments, at least one of the plurality of ontological statements is formatted to comply with an RDF Schema.

In some embodiments, the data set is a text file.

In some embodiments, the data set is formatted as a YAML or a JavaScript Object Notation (JSON) file.

In some embodiments, the ontology information includes concepts representing an entry point, an asset to be protected, and at least one type of user.

In some embodiments, the instructions, when executed by the one or more processors, further cause the system to determine that the first component is an asset based on the second edge connecting the first node and the third node.

In some embodiments, the first type of compute resource of the plurality of different types of compute resources utilized by the service associated with the user is a database service, and the first component is a database table to be implemented using the database service.

In some embodiments, the instructions, when executed by the one or more processors, further cause the system to prompt a user to provide input indicative of an edge that is to be drawn between two nodes in the graph, and to provide input indicative of a predicate describing the relationship between the nodes.

In some embodiments, the instructions, when executed by the one or more processors, further cause the system to provide a plurality of RDF statements representing the graph to a reasoner to perform at least a portion of a security review without user intervention.

In some embodiments, the instructions, when executed by the one or more processors, further cause the system to provide a query to the reasoner in connection with the plurality of RDF statements.

In accordance with some embodiments of the disclosed subject matter, a system is provided, the system comprising one or more processors and memory storing computer-executable instructions that, when executed by the one or more processors, cause the system to: obtain a data set describing at least a portion of a service associated with a user, wherein the service utilizes a plurality of different types of compute resources associated with a compute resource provider to implement components of the service; retrieve ontology information associated with a first type of compute resources of the plurality of different types of compute resources, wherein the ontology information includes a first potential threat associated with the first type of compute resources; and generate a graph comprising a first node associated with the first potential threat, a second node associated with a first component of the service that is to be provisioned using the first type of compute resources, and a third node associated with a security feature of the first component that mitigates the first threat, with a first edge between the first node and the third node indicating that the first component is associated with the security feature.

In some embodiments, the instructions, when executed by the one or more processors, further cause the system to treat reception of the data set as a request to generate a machine-readable threat model of the service associated with the user.

In some embodiments, the instructions, when executed by the one or more processors, further cause the system to present at least a portion of the graph to a user.

In some embodiments, the data set is an architecture model of the service.

In some embodiments, the data set is based on a scan of components of the service.

Although subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It should be understood that the above described steps of the processes of FIG. 5 can be executed or performed in any order or sequence not limited to the order and sequence shown and described in the figures. Also, some of the above steps of the processes of FIG. 5 can be executed or performed substantially simultaneously where appropriate or in parallel to reduce latency and processing times.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising one or more processors and memory storing computer-executable instructions that, when executed by the one or more processors, cause the system to:
 obtain a file that includes instructions for provisioning compute resources to implement a service associated with a user, wherein the file references a plurality of types of compute resources to be provisioned and the file includes instructions for generating a first customized resource of a first type of compute resource of the plurality of types of compute resources referenced by the file;
 determine that the file references the first type of compute resources;
 retrieve threat modeling information associated with the first type of compute resources, wherein the threat modeling information includes information identifying a first potential threat associated with the first type of compute resources;
 generate a graph comprising a plurality of nodes and a plurality of edges, wherein a first node represents the first type of compute resources, a second node represents the first customized resource, and a third node represents the first potential threat, and wherein an edge connecting the first node and the second node is associated with a predicate based on the relationship between the customized resource and the first type of resource;
 generate at least one ontological statement relating the first customized resource and the first type of compute resource; and
 provide a plurality of ontological statements, including the at least one ontological statement, representing the graph to a reasoner to perform at least a portion of a security review without user intervention, wherein performing at least a portion of the security review comprises identifying a threat and determining whether the service includes a corresponding mitigation for the threat.

2. The system of claim 1, wherein the at least one ontological statement is a Resource Description Framework (RDF) statement or a Web Ontology Language (OWL) statement.

3. The system of claim 1, wherein the threat modeling information associated with the first type of compute resources is at least a portion of an ontology related to the first type of compute resources.

4. The system of claim 1, wherein the instructions, when executed by the one or more processors, further cause the system to:
 generate a second edge between the second node and a fourth node representing an asset concept; and
 create an association between the second edge an RDF statement indicating that the customized resource is an example of an asset.

5. A system, comprising one or more processors and memory storing computer-executable instructions that, when executed by the one or more processors, cause the system to:
 obtain a request associated with a user to generate a machine-readable threat model of a service associated with the user, wherein the service utilizes a plurality of different types of compute resources associated with a compute resource provider to implement components of the service;
 obtain a data set describing how resources associated with the service are to be provisioned to implement at least a portion of the service, wherein the data set is configured to cause the compute resource provider to automatically provision the components of the service upon submission of a file to a system that can control deployment of the plurality of different types of compute resources;
 retrieve ontology information associated with a first type of compute resources of the plurality of different types of compute resources, wherein the ontology information includes information about a first potential threat associated with the first type of compute resources, and a statement describing a property of the first type of compute resources;
 generate a graph comprising a first node associated with the first type of compute resources, a second node associated with the first potential threat, a third node associated with a first component of the service that is provisioned using the first type of compute resources, and a fourth node associated with a security setting of the first component of the service that potentially mitigates the first potential threat, with a first edge between the first node and the second node indicating that the first potential threat is a threat to the first type of compute resources, a second edge between the first node and the third node indicating that the first component is an example of the first type of compute resources; and
 cause a representation of the graph to be presented, including an indication that the first potential threat is potentially mitigated by the security setting.

6. The system of claim 5, wherein the ontology comprises a plurality of ontological statements, each of the plurality of ontological statements being a Resource Description Framework (RDF) statement or a Web Ontology Language (OWL) statement.

7. The system of claim 6, wherein at least one of the plurality of ontological statements is formatted to comply with an RDF Schema.

8. The system of claim 5, wherein the data set is a text file.

9. The system of claim 8, wherein the data set is formatted as a YAML or a JavaScript Object Notation (JSON) file.

10. The system of claim 5, wherein the ontology information includes concepts representing an entry point, an asset to be protected, and at least one type of user.

11. The system of claim 10, wherein the instructions, when executed by the one or more processors, further cause the system to determine that the first component is an asset based on the second edge connecting the first node and the third node.

12. The system of claim 11, wherein the first type of compute resource of the plurality of different types of compute resources utilized by the service associated with the user is a database service, and the first component is a database table to be implemented using the database service.

13. The system of claim 11, wherein the instructions, when executed by the one or more processors, further cause the system to prompt a user to provide input indicative of an edge that is to be drawn between two nodes in the graph, and to provide input indicative of a predicate describing the relationship between the nodes.

14. The system of claim 5, wherein the instructions, when executed by the one or more processors, further cause the system to provide a plurality of RDF statements representing the graph to a reasoner to perform at least a portion of a security review without user intervention.

15. The system of claim 14, wherein the instructions, when executed by the one or more processors, further cause the system to provide a query to the reasoner in connection with the plurality of RDF statements.

16. A system, comprising one or more processors and memory storing computer-executable instructions that, when executed by the one or more processors, cause the system to:
- obtain a data set describing at least a portion of a service associated with a user, wherein the service utilizes a plurality of different types of compute resources associated with a compute resource provider to implement components of the service;
- retrieve ontology information associated with a first type of compute resources of the plurality of different types of compute resources, wherein the ontology information includes a first potential threat associated with the first type of compute resources; and
- generate a graph comprising a first node associated with the first potential threat, a second node associated with a first component of the service that is to be provisioned using the first type of compute resources, a third node associated with a security feature of the first component that mitigates the first potential threat, and a fourth node associated with a security setting of the first component of the service that potentially mitigates the first potential threat, with a first edge between the first node and the third node indicating that the first component is associated with the security feature.

17. The system of claim 16, wherein the instructions, when executed by the one or more processors, further cause the system to treat reception of the data set as a request to generate a machine-readable threat model of the service associated with the user.

18. The system of claim 16, wherein the instructions, when executed by the one or more processors, further cause the system to present at least a portion of the graph to a user.

19. The system of claim 16, wherein the data set is an architecture model of the service.

20. The system of claim 16, wherein the data set is based on a scan of components of the service.

* * * * *